United States Patent
Ma

(10) Patent No.: US 8,604,869 B1
(45) Date of Patent: Dec. 10, 2013

(54) CHARGE PUMP WITH A WIDE INPUT SUPPLY RANGE

(75) Inventor: Jianxin Ma, Plano, TX (US)

(73) Assignee: Maxim Integrated Products, Inc., San Jose, CA (US)

( * ) Notice: Subject to any disclaimer, the term of this patent is extended or adjusted under 35 U.S.C. 154(b) by 0 days.

(21) Appl. No.: 13/491,001

(22) Filed: Jun. 7, 2012

(51) Int. Cl.
*G05F 1/10* (2006.01)

(52) U.S. Cl.
USPC ............................ 327/536; 327/143; 327/540

(58) Field of Classification Search
USPC ......... 327/536, 538, 530, 534, 539, 540, 545, 327/589, 142, 143, 198, 390
See application file for complete search history.

(56) References Cited

U.S. PATENT DOCUMENTS

| | | | |
|---|---|---|---|
| 6,177,828 B1 * | 1/2001 | Kang et al. | 327/536 |
| 7,639,067 B1 * | 12/2009 | Perisetty | 327/537 |
| 8,013,666 B1 * | 9/2011 | Liu | 327/536 |
| 2002/0008568 A1 * | 1/2002 | Sugimura | 327/536 |
| 2004/0239408 A1 * | 12/2004 | Chen et al. | 327/536 |
| 2006/0164155 A1 * | 7/2006 | Ragone et al. | 327/536 |
| 2009/0115494 A1 * | 5/2009 | Consuelo et al. | 327/536 |

* cited by examiner

*Primary Examiner* — Lincoln Donovan
*Assistant Examiner* — Jung H. Kim
(74) *Attorney, Agent, or Firm* — North Weber & Baugh LLP

(57) ABSTRACT

Various embodiments of the present invention relate to a voltage generator, and more particularly, to systems, devices and methods of configuring a charge pump system by incorporating an auxiliary charge pump to generate an intermediate voltage that is used to boost up a primary charge pump according to a level of an input supply voltage. The intermediate voltage has a higher level than that of the input supply voltage, and is provided to boost up the primary charge pump when the input supply voltage is determined to be lower than a threshold voltage. Such a charge pump based voltage generator is compatible to a wide input supply range, capable of sustaining a large output load and effectively reduces the chip estate.

8 Claims, 7 Drawing Sheets

100

150

300

CHARGE PUMP WITH A WIDE INPUT SUPPLY RANGE

BACKGROUND

A. Technical Field

The present invention relates to a voltage generator, and more particularly, to systems, devices and methods of configuring a charge pump system by incorporating an auxiliary charge pump to generate an intermediate voltage that is used to boost up a primary charge pump according to a level of an input supply voltage. Such a charge pump based voltage generator is compatible to a wide input supply range, capable of sustaining a large output load and effectively reduces the chip estate.

B. Background of the Invention

A charge pump is widely applied in digital and analog electronics to provide a voltage that is beyond a range between its high and low supply voltages. For instance, in flash memory and light emitting diode (LED) drivers, the charge pump is coupled to receive an input supply voltage that may vary within a wide voltage range, and has to generate a supply voltage that has a fixed level that is higher than that of the supply voltage. This supply voltage is used to erase memory cells in the flash memory, or generate a desirable LED current to drive the LED drivers.

FIGURE. ("FIG.") 1A illustrates a typical charge pump 100. Such a charge pump 100 is normally implemented as a DC to DC converter that uses capacitors as energy storage elements. The charge pump 100 alternates between periodic charging and discharging cycles. During a charging cycle, switches 102 and 104 are turned on, while switches 106 and 108 are disabled. A capacitor 110 is coupled between an input supply voltage VIN and the ground, and charged up to store a certain amount of electrical charges. During a subsequent discharging cycle, switches 106 and 108 are enabled, while switches 102 and 104 are switched off. Capacitor 110 is biased between the input supply voltage VIN and an output of the charge pump 100, and further coupled in series with a load capacitor 112 loaded at this output. The electrical charges previously stored in capacitor 110 are redistributed to the load capacitor 112, generating a charge pump (CP) output voltage VCPM.

Switches 102-108 may be implemented using a complementary metal-oxide-silicon (CMOS) analog switch, or particularly, a CMOS transmission gate 150 as illustrated in FIG. 1B. The switch 150 comprises a n-type MOS (NMOS) transistor and a p-type MOS (PMOS) transistor that are coupled in parallel. The transistor gates are respectively controlled by two complementary switch control signals SW_EN and SW_EN_. As a result, the switch 150 controls the connection between an input node IN and an output node OUT. The complementary switch control signals SW_EN and SW_EN_ are generated via an internal oscillator driven by the CP output VCP. Transistors used in switches 102-108 are selected according to the levels of the input supply voltage VIN and the CP output voltage VCP. For instance, when the input supply VIN is 3.6V, switches 102-108 are normally made of 3V PMOS and NMOS transistors.

A wide range for the input supply VIN is desirable for the charge pump 100, but many charge pumps cannot start properly when the input supply VIN is extended to a low level, e.g., less than 1.0V. Prior to reaching a desirable level, the CP output voltage VCPM has to be initially charged up to the level of the input supply VIN. During power up, PMOS transistors in switches 102-108 are controlled to enable the above alternating charging and discharging cycles, and due to the low levels of VIN and VCPM, the on-resistance of the analog switch 150 is normally relatively large. The charge pump may not sustain a sufficient current to drive an output load coupled at the charge pump output, and particularly, the startup process most probably fails when the output load is relatively large. Therefore, the CP output voltage VCPM is pulled down by the output load, rather than being charged up, due to the insufficient VIN level and the large load.

Even when the CP output voltage VCPM is successfully charged up, the efficiency of the charge pump 100 has to be compromised in order to maintain a small chip area. For higher operation efficiency, PMOS and NMOS transistors of larger size are desired, such that the equivalent resistance of the analog switches 102-108 is reduced and the drive current is enhanced to charge/discharge the load capacitor 112 efficiently. However, larger transistors are unavoidably associated with more chip area. When a smaller chip estate is demanded for a cost or power concern, more current is consumed to charge and discharge the gates of these larger transistors, and the efficiency of the charge pump 100 may have to be compromised in a conventional charge pump 100.

A better solution is needed to ensure a proper startup at a low input supply voltage, efficient operation, and a small chip estate in a voltage generator.

SUMMARY OF THE INVENTION

Various embodiments of the present invention relate to a voltage generator, and more particularly, to systems, devices and methods of configuring a charge pump system by incorporating an auxiliary charge pump to generate an intermediate voltage that is used to boost up a primary charge pump according to a level of an input supply voltage. Such a charge pump based voltage generator is compatible to a wide input supply range, capable of sustaining a large output load and effectively reduces the chip estate.

One aspect of the invention is a voltage generator that comprises a pump controller, a primary charge pump and an auxiliary charge pump. The pump controller generates a primary control and an auxiliary control according to the level of an input supply voltage. The primary charge pump is controlled by the primary control to generate a charge pump output voltage driving a load. The auxiliary charge pump is controlled by the auxiliary control to generate the intermediate voltage. The intermediate voltage has a higher level than that of the input supply voltage, and is provided to boost up the primary charge pump when the input supply voltage is determined to be lower than a reference voltage in the pump controller.

One aspect of the invention is a method of regulating an input supply voltage to generate a charge pump output voltage. The input supply voltage is received, and its level is used to determine whether to use an auxiliary charge pump to start up and drive a primary charge pump. The auxiliary charge pump is enabled to provide an intermediate voltage when the input supply voltage is lower than a reference voltage. The intermediate voltage has a higher level than that of the input supply voltage, and is used to boost up the primary charge pump that further drives a load.

Another aspect of the invention is a charge pump system that comprises a charge pump core circuit and a voltage dependent oscillator that is used as a switch controller to control analog switches included in the charge pump core circuit. The analog switches are controlled by complementary switch controls to allow the charge pump system to alternate between charging and discharging cycles and generate an output voltage. The voltage-dependent oscillator is driven by the output voltage, and provides a voltage-dependent clock for generating the complementary switch controls. The frequency of the voltage-dependent clock increases with the magnitude of the output voltage when the output voltage is lower than a threshold voltage, and saturates when the output voltage reaches a threshold voltage. By this means, the charging and discharging cycles are controlled at a slower rate for a proper startup of the charge pump system.

Certain features and advantages of the present invention have been generally described in this summary section; however, additional features, advantages, and embodiments are presented herein or will be apparent to one of ordinary skill in the art in view of the drawings, specification, and claims hereof. Accordingly, it should be understood that the scope of the invention shall not be limited by the particular embodiments disclosed in this summary section.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

Figure 1A:
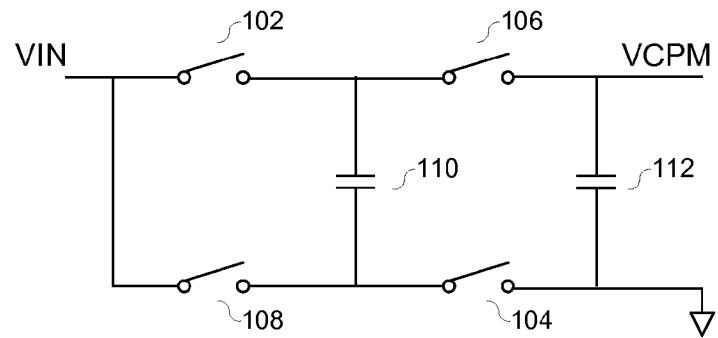
FIG. 1A illustrates a typical charge pump.

In the following description, for the purpose of explanation, specific details are set forth in order to provide an understanding of the invention. It will be apparent, however, to one skilled in the art that the invention can be practiced without these details. One skilled in the art will recognize that embodiments of the present invention, described below, may be performed in a variety of ways and using a variety of means. Those skilled in the art will also recognize additional modifications, applications, and embodiments are within the scope thereof, as are additional fields in which the invention may provide utility. Accordingly, the embodiments described below are illustrative of specific embodiments of the invention and are meant to avoid obscuring the invention.

Reference in the specification to "one embodiment" or "an embodiment" means that a particular feature, structure, characteristic, or function described in connection with the embodiment is included in at least one embodiment of the invention. The appearance of the phrase "in one embodiment," "in an embodiment," or the like in various places in the specification are not necessarily all referring to the same embodiment.

Furthermore, connections between components or between method steps in the figures are not restricted to connections that are effected directly. Instead, connections illustrated in the figures between components or method steps may be modified or otherwise changed through the addition thereto of intermediary components or method steps, without departing from the teachings of the present invention.

Various embodiments of the invention relates to a voltage generator, and more particularly, to systems, devices and methods of configuring a charge pump system by incorporating an auxiliary charge pump to generate an intermediate voltage that is used to boost up a primary charge pump according to a level of an input supply voltage. The primary charge pump provides power for driving a load; and the auxiliary charge pump provides an intermediate voltage for controlling both pumps in this charge pump system, and particularly, for driving switch drivers in the primary charge pump.

The intermediate voltage allows this charge pump system to sustain a proper startup and an efficient operation under critical conditions. When the input supply VIN extends to a relatively low voltage, the auxiliary and primary charge pump are sequentially enabled, such that the primary charge pump may rely on the auxiliary charge pump to provide the intermediate voltage that is relatively higher than the input supply voltage VIN. This intermediate voltage sustains enhanced overdrive voltages for switch transistors within the primary charge pump, and allows the primary charge pump to start up properly at a relatively low input supply VIN. During an operation, the intermediate voltage also results in a higher overdrive voltage to drive the analog switches within the primary charge pump, such that the size of the analog switches may be largely suppressed. Even upon driving a large load, the primary charge pump may still provide sufficient current to start up properly and operate efficiently. Therefore, such a charge pump system is compatible to a wide input supply range, capable of sustaining a large output load and effectively reduces the chip estate.

Figure 2:
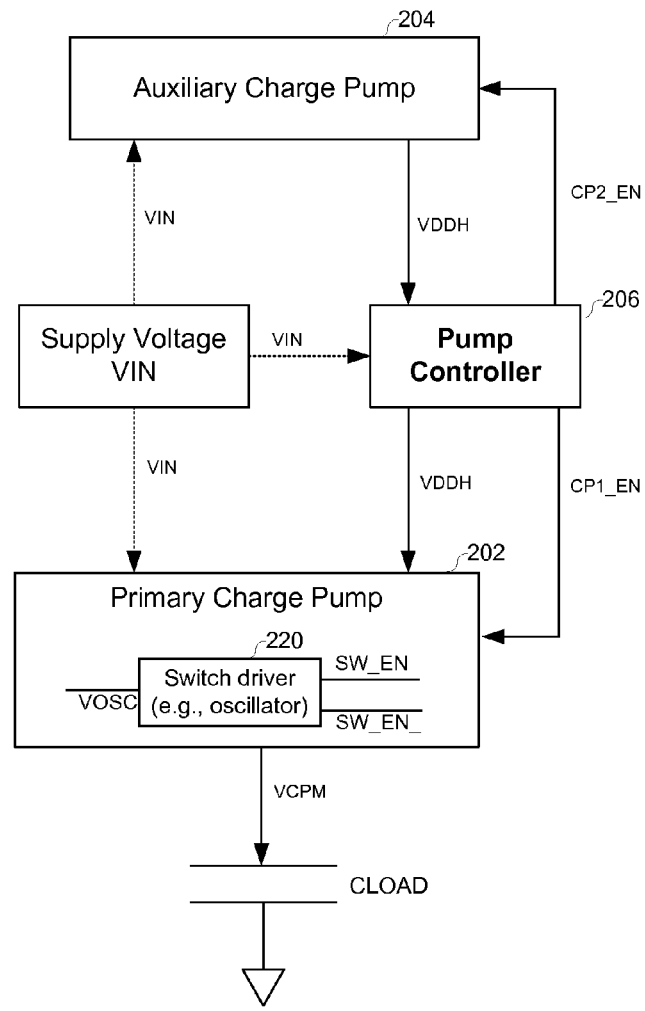
FIG. 2 illustrates an exemplary block diagram of a charge pump system according to various embodiments of the invention.
Figure 2:
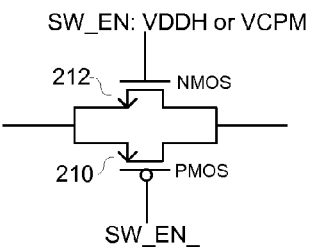

FIG. 2 illustrates an exemplary block diagram 200 of a charge pump system according to various embodiments of the invention. The charge pump system 200 comprises a primary charge pump 202, an auxiliary charge pump 204, and a pump controller 206. The charge pump system 200 is coupled to receive an input supply voltage VIN, and generates a charge pump (CP) output voltage VCPM to drive a load capacitor CLOAD. In various embodiments of the invention, the CP output voltage VCPM may be several times of the input supply voltage VIN, and accordingly, the charge pump 202 may constitute a voltage doubler, tripler or quadrupler circuit.

The primary charge pump 202 incorporates several analog switches 208 that are controlled by a switch driver 220 to enable charging and discharging processes between consecutive clock cycles. The equivalent resistance of the analog switches 208 directly impacts the rate of charging and discharging. These analog switches 208 may adopt a configuration based on a CMOS transmission gate that comprises a PMOS transistor 210 and a NMOS transistor 212. The PMOS and NMOS transistors 210 and 212 are coupled in parallel by shorting their sources and drains respectively, while their gates are controlled by a pair of complementary switch controls SW_EN and SW_EN_. The complementary switch controls SW_EN and SW_EN_ are provided by the switch driver 220 which is further driven by a drive voltage VOSC. This drive voltage VOSC is selected from the input supply voltage VIN, the CP output voltage VCPM, and an intermediate voltage VDDH provided by the auxiliary charge pump. In one embodiment, the switch driver 220 is implemented as an oscillator that generates two complementary clocks as the controls SW_EN and SW_EN_.

An overdrive voltage is a gate-to-source voltage (VGS) in excess of a transistor threshold voltage (VTH). With fixed transistor dimensions, the overdrive voltages of the transistors 210 and 212 have to be increased, so as to reduce the equivalent resistance of the analog switches 208 and enhance the charging and discharging rates in the primary charge pump 202. The drive voltage VOSC is normally coupled to the CP output voltage VCPM in a conventional charge pump. However, in various embodiments of the invention, the drive voltage VOSC is preferably selected among VIN, VCPM and VDDH so as to improve the overdrive voltages of the transistors 210 and 212 included in the analog switches 212.

The drive voltage VOSC is determined according to an input condition and a load condition. As the input supply voltage VIN is at a relatively low level, e.g., 1V, the CP output voltage VCPM is low as well during a startup stage. When the controls SW_EN and SW_EN_ are associated with VIN or VCPM, the large equivalent resistance of the switch 208 may ultimately fail charging and discharging within the startup process. Moreover, if a charge pump output current is insufficient to support a large load, the primary charge pump 202 may not start up at all. In order to address this issue, the drive voltage VOSC needs to be enhanced beyond the level of the input voltage VIN, such that the overdrive voltages across the transistor 210 and 212 are sufficiently high to boost up the CP output voltage VCPM. Therefore, upon receiving a low input voltage VIN and driving a large load, the switches 208 in the primary charge pump 202 need to be controlled by the intermediate voltage VDDH that has an enhanced level than VIN or VCPM, and under this circumstance, the charge pump system 200 operates in a boost mode.

In some embodiments, the intermediate voltage VDDH is provided by the auxiliary charge pump 204. The intermediate voltage has a higher voltage level than the input supply voltage VIN, and provides enhanced overdrive voltages to the transistors in the analog switch 208. Since the auxiliary charge pump 204 is separated from the external load, it is not impacted by the load condition at an output of the charge pump system 200. As a result, the auxiliary charge pump 204 may thus start up relatively easily to provide the intermediate voltage VDDH, even when the analog switches within the auxiliary charge pump 204 have to be controlled by a low voltage VIN or VDDH.

The pump controller 206 generates a primary CP control CP1_EN and an auxiliary CP control CP2_EN according to the level of the input supply voltage VIN. These two CP controls CP1_EN and CP2_EN are used to control the primary and auxiliary charge pumps 202 and 204, respectively. The input supply voltage VIN is associated with a reference voltage VREF. As the input supply voltage VIN is substantially higher than the reference voltage VREF, both CP controls CP1_EN and CP2_EN may be disabled. The input supply voltage VIN bypasses both primary and auxiliary charge pumps, and is coupled directly to the output of the charge pump system 200. Otherwise, when the input supply voltage VIN is substantially lower than VREF, i.e., in the boost mode, the auxiliary CP control CP2_EN may be set to enable the auxiliary charge pump 204, providing the intermediate voltage VDDH. As the voltage VDDH increases up to a certain level, the primary CP control CP1_EN is enabled to activate the primary charge pump 202 which is subsequently driven by the intermediate voltage VDDH. Therefore, the CP controls CP1_EN and CP2_EN are responsive to the input supply voltage VIN, and in the boost mode, they are applied to control the sequential operations of the primary and auxiliary charge pumps 202 and 204.

Figure 3:
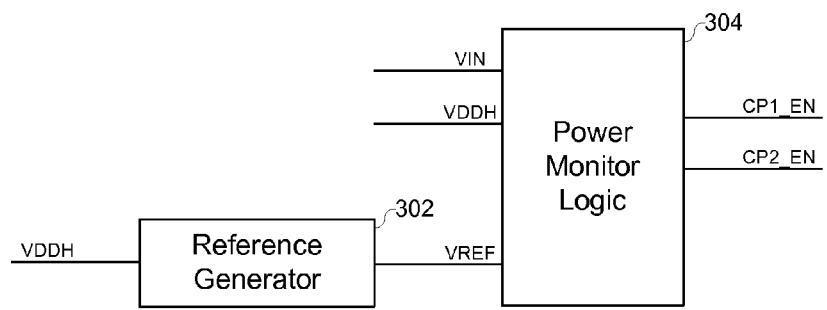
FIG. 3 illustrates an exemplary block diagram of a pump controller according to various embodiments of the invention.

FIG. 3 illustrates an exemplary block diagram of a pump controller 206 according to various embodiments of the invention. The pump controller 206 is coupled to receive the input supply voltage VIN, and the intermediate voltage VDDH. A reference generator 302 is included in the pump controller 206, and generated a reference voltage VREF. In some embodiments, the reference generator 302 relies on the auxiliary charge pump 204 to provide the intermediate voltage VDDH as a supply voltage. A power monitor logic 304 is applied to compare the input supply voltage VIN with the reference voltage VREF to determine whether the controls CP1_EN and CP2_EN are enabled.

In an exemplary normal mode, the reference voltage is predetermined as 1.7V, and the input supply voltage VIN is 2V. The power monitor logic 304 compares the reference and input supply voltages. Since the input supply voltage VIN is substantially higher than the reference voltage VREF, the controls CP1_EN and CP2_EN are disabled to deactivate both primary and auxiliary charge pump 202 and 204. The power monitor logic 304 also controls the input supply voltage VIN to bypass both charge pumps 202 and 204, and to be shorted to the output of the entire charge pump system 200.

In another exemplary boost mode, the input supply voltage VIN is as low as 1.5V while the reference voltage remains as 1.7V. The auxiliary charge pump 204 is initialized to generate an intermediate voltage VDDH of 2.5V, and the reference generator 302 is driven by VDDH to provide the predetermined reference voltage VREF at a level of 1.7V. Upon detecting that the input supply voltage VIN is substantially lower than the reference voltage VREF, the power monitor logic 304 keeps the control CP2_EN high to sustain the operation of the auxiliary charge pump 204, while the control CP1_EN is enabled to drive the primary charge pump 202 with both the input supply voltage VIN and the intermediate voltage VDDH.

In particular, the drive voltage VOSC is coupled to the intermediate voltage VDDH, rather than the CP output voltage VCPM, in the boost mode. Levels of the complementary switch controls SW_EN and SW_EN_ are enhanced to enlarge the overdrive voltages of the transistors 210 and 212, and reduce the equivalent resistances of the switches in the primary charge pump 202. As a result, the load capability of the charge pump system 200 is enhanced in comparison to use of a single charge pump.

In various embodiments of the invention, the intermediate voltage VDDH is regulated to a certain saturation voltage $V_{SAT}$, and the pump controller 206 determines whether the saturation voltage is reached. For example, the intermediate voltage VDDH may be associated with a saturation voltage $V_{SAT}$ of 2.5V. When the auxiliary charge pump 204 is a voltage tripler, the input supply is tripled only when it is lower than a certain level associated with the saturation voltage. The pump controller 206 compares the intermediate voltage VDDH to another VDDH reference voltage to determine whether the saturation voltage $V_{SAT}$ is reached.

In one embodiment, the intermediate voltage VDDH is properly scaled and compared to the same reference voltage VREF used to identify the level of the input supply VIN.

Although the load-based startup issue at a low input supply VIN may be efficiently addressed by use of the auxiliary charge pump 204, the auxiliary charge pump 204 may still be faced with some startup issues related with slow charging and discharging processes. Such startup issues are commonly seen in charge pumps that are driven by a low input supply, and the auxiliary charge pump 204 is one of such charge pumps. The auxiliary charge pump 204 relies on an internal oscillator to provide a clock that controls its alternating charging and discharging cycles. The oscillator preferably operates at a relatively higher frequency, such that more output current can be provided, and capacitors can be minimized. However, a fast clock may cause a startup issue, especially in the boost mode, when the input supply VIN is substantially low. In various embodiments of the invention, a voltage-dependent oscillator is used in the auxiliary charge pump 204 to address this issue, and a fast clock is used in operation while a relatively slow clock is used in startup.

During startup, more time is reserved for each charging and discharging cycle. As both the input supply VIN and the charge pump output VDDH are low during startup, the effective resistances of switches are higher, and more time is needed. The load for the charge pump need to be disabled or disconnected until the charge pump output reaches a target voltage. Thereafter, the fast clock is used to control the charge pump for normal operation, and high precision is maintained for this fast clock.

Figure 1B:
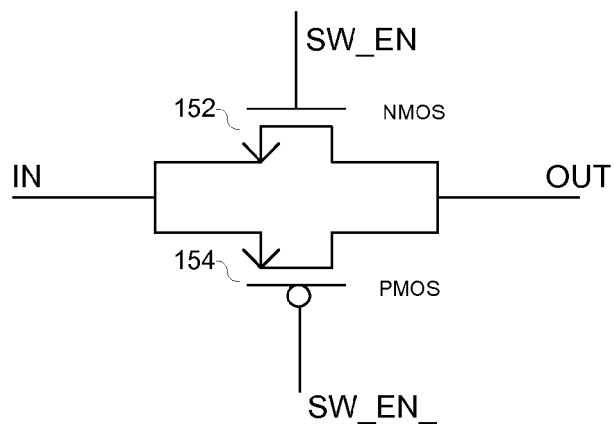
FIG. 1B illustrates a CMOS transmission gate used as an analog switch.
Figure 4A:
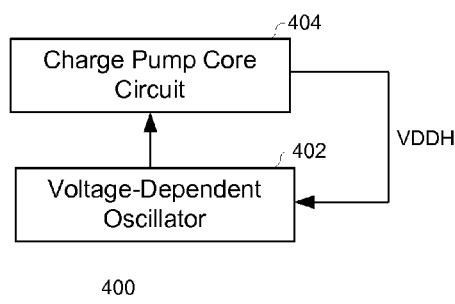
FIG. 4A illustrates an exemplary auxiliary charge pump based on a voltage-dependent oscillator according to various embodiments in the invention.
Figure 4B:
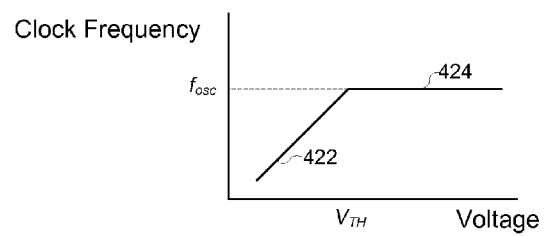
FIG. 4B illustrates an exemplary relationship between a clock frequency and a supply voltage VIN in a voltage-dependent oscillator according to various embodiments in the invention.

FIG. 4A illustrates an exemplary auxiliary charge pump 400 based on a voltage-dependent oscillator 402 according to various embodiments in the invention, and FIG. 4B illustrates an exemplary relationship 420 between a clock frequency and an input supply voltage VDDH in a voltage-dependent oscillator 402 according to various embodiments in the invention. In some embodiments, the auxiliary charge pump 400 adopts a conventional configuration as disclosed in FIG. 1, except that a voltage-dependent oscillator 402 is used as a switch driver. A charge pump core circuit 404 receives the input supply VIN, and generates an intermediate voltage VDDH. The voltage-dependent oscillator 402 is driven by this intermediate voltage VDDH, and provides complementary clock signals for use as complementary switch controls controlling switches within the charge pump core circuit 404. In order to boost up the charge pump 400 during a startup, the clock frequency provided by the voltage-dependent oscillator 402 increases with the intermediate voltage below a threshold voltage $V_{TH}$, and saturates at a value of $f_{OSC}$ once the intermediate voltage increases beyond $V_{TH}$. In one embodiment, this threshold voltage $V_{TH}$ is substantially equal or smaller than the saturation voltage $V_{SAT}$ of the intermediate voltage.

During a startup, the intermediate voltage VDDH increases from a low voltage, i.e., ground, to a target intermediate voltage, and the clock frequency from the voltage-dependent oscillator 402 varies accordingly. FIG. 4B illustrates an exemplary linear frequency-VDDH relationship 422, while alternative non-linear relationships are applicable as well. The clock frequency is reduced to boost up the charge pump core circuit 404 at the relatively low intermediate voltage VDDH, and ultimately stabilized at a relatively high value $f_{OSC}$ for high precision clock output. In various embodiments of the invention, this voltage-dependent oscillator 402 may ensure an efficient startup process for the auxiliary charge pump 204, while maintaining high precision clock output during normal operation.

Figure 4C:
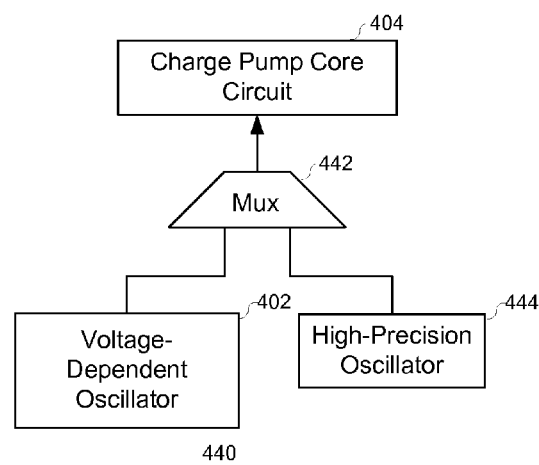
FIG. 4C illustrates another exemplary auxiliary charge pump based on two complementary oscillators according to various embodiments in the invention.

FIG. 4C illustrates another exemplary auxiliary charge pump 440 based on two complementary oscillators according to various embodiments in the invention. A multiplexer 442 is coupled to receive the intermediate voltage VDDH from the charge pump core circuit 404, and selects an oscillator from a voltage-dependent oscillator 402 and a high-precision oscillator 444. When the intermediate voltage VDDH is lower than a threshold voltage $V_{TH}$, the voltage-dependent oscillator 402 is selected to provide a voltage-dependent clock having an adjustable frequency and boost up the related charge pump startup. However, during normal operation, i.e., when the intermediate voltage VDDH is higher than the threshold voltage $V_{TH}$, the high-precision oscillator 444 is selected to provide a high-precision clock to the charge pump core circuit 404 and boost the current output at the output of the charge pump 440. The frequency of the high-precision clock is substantially higher than that of the voltage-dependent clock. Use of the complementary oscillators 402 and 444 conveniently addresses both issues of proper startup and high efficiency operation in the auxiliary charge pumps 204.

In a preferred embodiment, the voltage-dependent oscillator 402 is a ring oscillator. The ring oscillator comprises an odd number of inverters, and generates outputs between a supply voltage and a ground voltage. As the supply voltage for the ring oscillator increases, the frequency of the outputs automatically increases. In another embodiment, the high precision oscillator 404 is a relaxation oscillator.

Figure 5:
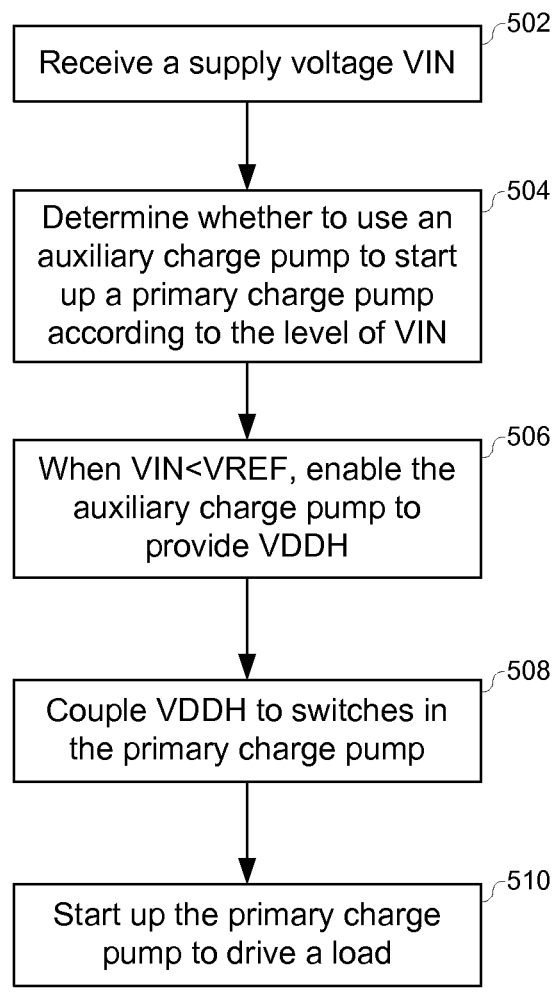
FIG. 5 illustrates an exemplary voltage regulation method using a primary charge pump and an auxiliary charge pump according to various embodiments in the invention.

FIG. 5 illustrates an exemplary voltage regulation method 500 using a primary charge pump and an auxiliary charge pump according to various embodiments in the invention. The method 500 is mainly used to expand the range of an input supply voltage to a lower voltage end, and thus, enables voltage generation compatible to a wide input supply range. At step 502, both charge pumps are coupled to receive a supply voltage VIN. At step 504, the supply voltage VIN is further monitored to determine whether the auxiliary charge pump is needed to start up the primary charge pump. When the supply voltage VIN is below a reference voltage VREF, the auxiliary charge pump is sustained to provide an intermediate voltage VDDH at step 506.

In one embodiment, the reference voltage VREF is generated from the intermediate voltage VDDH, and the auxiliary charge pump has to be initially enabled to provide the intermediate voltage VDDH. Once the supply voltage VIN is detected lower than the reference voltage VREF, the auxiliary charge pump remains enabled and maintains its operation as in step 506. However, when the supply voltage VIN is higher than the reference voltage VREF, the auxiliary charge pump is disabled.

At step 508, the intermediate voltage VDDH is coupled to control the switches in the primary charge pump. In some embodiments, the intermediate voltage VDDH is applied to drive a switch driver within the primary charge pump, and the switch driver further generates complementary switch controls to control switches within the primary charge pump. At step 510, the primary charge pump is started up and drives a load. In one embodiment, the switch driver is implemented as an oscillator.

Upon a large load, this voltage regulation method 500 allows the primary charge pump to properly start up at a low input supply VIN, and thus, efficiently ensures both startup and regular operation over a wide range of the input supply. Moreover, the use of the intermediate voltage allows smaller transistors to be used for the analog switches in the charge pump system, thus reducing the overall chip area used by the primary charge pump. As a result, cost efficiency of the charge pump system 300 is enhanced, while the performances are improved as well.

Figure 6:
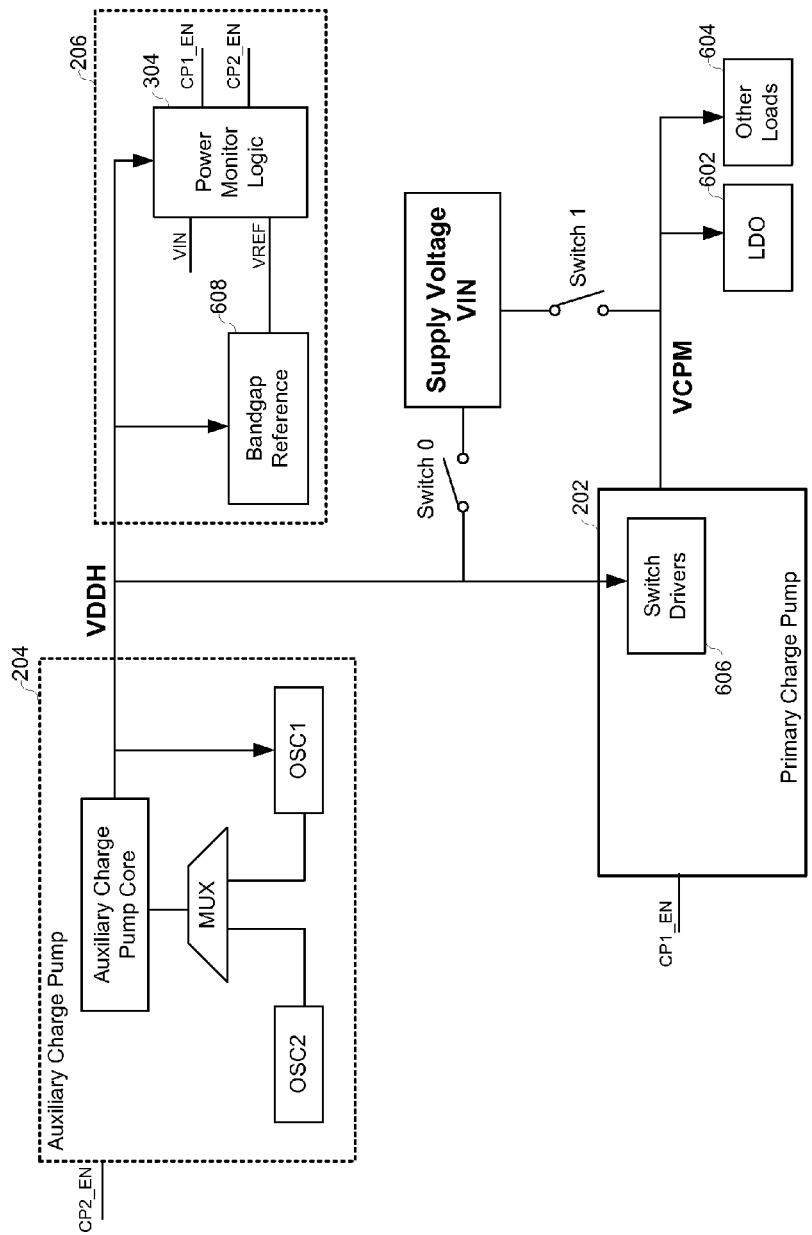
FIG. 6 illustrates another exemplary block diagram of a charge pump system 200 according to various embodiments in the invention.
Figure 7:
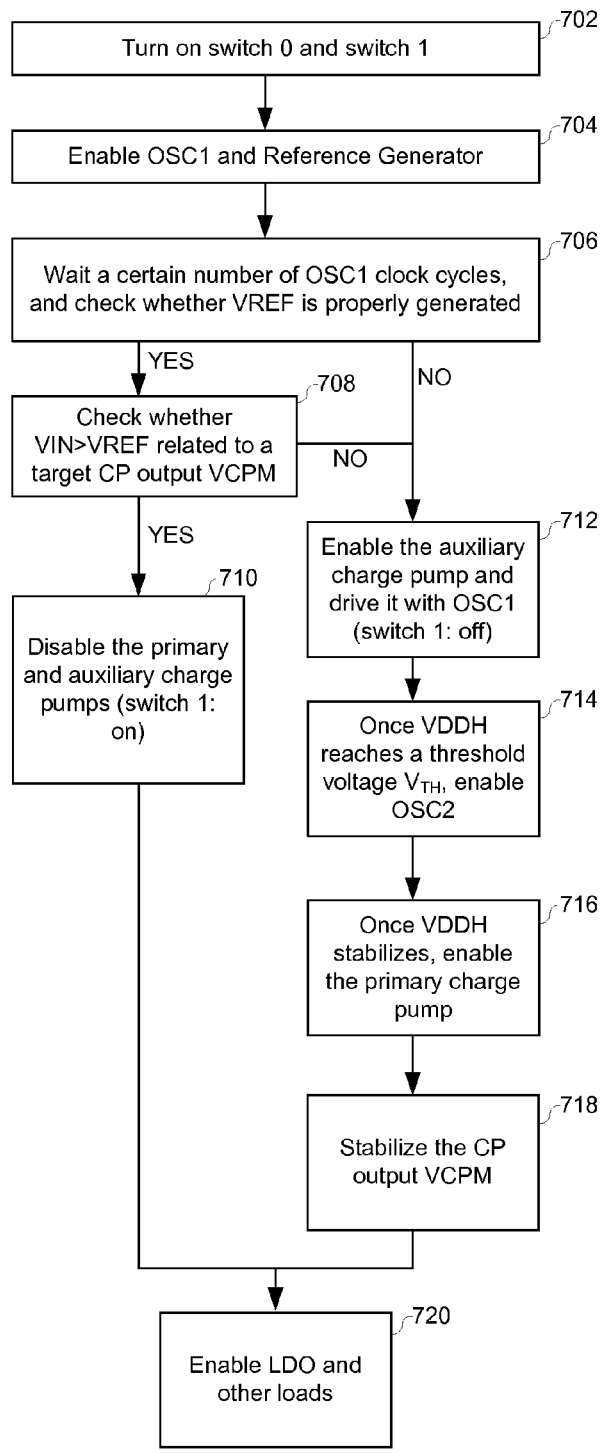
FIG. 7 illustrates a flow chart for a startup sequence of a charge pump system according to various embodiments in the invention.

FIG. 6 illustrates another exemplary block diagram 600 of a charge pump system 200 according to various embodiments in the invention, and FIG. 7 illustrates a flow chart 700 for a startup sequence of the charge pump system 600 according to various embodiments in the invention. A primary charge pump 202 provides power for loading a low drop-out regulator (LDO) 602 and other loads 604. The primary charge pump 202 further comprises a switch driver 220 and switches. An auxiliary charge pump 204 provides an intermediate voltage VDDH that is used to drive the switch driver 220 within the primary charge pump 202, and to generate control signals in a pump controller 206. Both the intermediate voltage VDDH and the CP output VCPM may be shorted to the input supply VIN under the control of a switch 0 and a switch 1. The pump controller 206 senses the levels of VIN, VDDH and VCPM, and generates the charge pump controls CP1_EN, CP2_EN and the switch controls for switches 0 and 1.

The auxiliary charge pump 204 includes a first oscillator OSC1 and a second oscillator OSC2. Both oscillators are alternatively used as a switch driver under different conditions. The first oscillator generates a low frequency clock having a frequency related to the level of the intermediate voltage VDDH, and is primarily used during startup. The second oscillator generates a high-precision clock having a substantially constant, but large, frequency; and is primarily used during normal operation.

To start up a charge pump system 200, switches 0 and 1 are turned on at step 702, such that both the intermediate voltage VDDH and CP voltage VCPM are initialized at the level of the input supply VIN. The first oscillator OSC1 within the auxiliary charge pump 204 and the reference generator 302 in the pump controller 206 are enabled at step 704. After a certain number of OSC1 clock cycles, a reference voltage VREF is checked. If VREF is not generated properly since VIN is too low, the auxiliary charge pump has to be enabled (step 712). Otherwise, when VREF is generated properly, the input supply VIN is coupled to compare to VREF that is associated with a target charge pump output VCPM (step 708).

If the input supply VIN is larger than the reference voltage VREF, both the primary and auxiliary charge pumps 202 and 204 are disabled, and switch 1 is turned on to short the CP output VCPM to the input supply VIN at step 710. A voltage regulator may be coupled at the output of the primary charge pump, and regulate the input supply VIN to the target CP output VCPM. If the input supply VIN is smaller than the target CP output VCPM, both switches 0 and 1 are turned off, and the auxiliary charge pump is enabled at step 712.

During the initial startup course of the auxiliary charge pump 204, the oscillator OSC1 remains active, and provides switch controls in the auxiliary charge pump 204 (step 712). Once the intermediate voltage VDDH reaches a threshold voltage $V_{TH}$ at step 714, the oscillator OSC2 is enabled, and OSC1 is disabled. The intermediate voltage VDDH stabilizes at step 716, and thereafter, the primary charge pump 202 may be enabled. The CP output VCPM stabilizes at step 718. Following either of steps 710 and 718, the LDO and other loads at the CP output VCPM are enabled at step 720.

In the embodiment in FIG. 6, the reference generator 608 is implemented using a bandgap reference 608 that provides a bandgap reference voltage VREF'. The bandgap reference voltage VREF' is substantially independent of the intermediate voltage VDDH. An exemplary bandgap reference voltage VREF' generated by the bandgap reference 608 is at a level of 1.2V. This bandgap reference voltage VREF' is not only used to determine the level of the input supply VIN at step 708, but also used to determine whether the intermediate voltage VDDH has stabilized at the saturation voltage $V_{SAT}$ at step 716. The intermediate voltage VDDH is scaled according to the saturation voltage VSAT, e.g., 2.5V, and similarly, the input supply VIN is scaled according to the target reference voltage VREF, e.g., 1.7V, before either of them is compared to the bandgap reference voltage VREF'. A respective resistive divider may be used to scale the intermediate voltage VDDH and the input supply VIN. Therefore, the bandgap reference 608 may be used as a reference generator 302 to provide one single reference voltage VREF' that is shared in both control processes of VIN and VDDH within the pump controller 206.

While the invention is susceptible to various modifications and alternative forms, specific examples thereof have been shown in the drawings and are herein described in detail. It should be understood, however, that the invention is not to be limited to the particular forms disclosed, but to the contrary, the invention is to cover all modifications, equivalents, and alternatives falling within the scope of the appended claims.

What is claimed is:

1. A voltage generator that is driven by an input supply voltage, comprising:
   a pump controller, the pump controller generates a primary control and an auxiliary control according to level of the input supply voltage;
   a primary charge pump, coupled to the pump controller, the primary charge pump being controlled by the primary control to generate charge pump output voltage and drive a load; and
   an auxiliary charge pump, coupled to the pump controller and the primary charge pump, the auxiliary charge pump being controlled by the auxiliary control to generate an intermediate voltage, wherein after determining that the input supply voltage is lower than a reference voltage generated in the pump controller, the auxiliary charge pump generates the intermediate voltage with a voltage level higher than the input supply voltage, resulting in an increase in the primary charge pump output voltage, and
   wherein the pump controller further comprises a reference generator, that is coupled to the auxiliary charge pump, the reference generator being driven by the intermediate voltage and generating the reference voltage.

2. The voltage generator according to claim 1, wherein the primary charge pump further comprises:
   a switch driver that is driven by a drive voltage selected from a group consisting of the input supply voltage, the charge pump output voltage and the intermediate voltage, the switch driver generating a plurality of switch controls that is associated with the intermediate voltage when the input supply voltage is lower than the reference voltage; and
   a plurality of analog switches, coupled to the switch driver, the plurality of analog switches being controlled by the plurality of switch controls such that the primary charge pump alternates between charging and discharging cycles and the charge pump output voltage is properly charged up.

3. The voltage generator according to claim 2, wherein at least one analog switch in the plurality of analog switches is based on a CMOS transmission gate, and an overdrive voltage for a transistor in the CMOS transmission gate is enhanced to facilitate the charging and discharging processes when the input supply voltage is lower than the reference voltage and the intermediate voltage is used.

4. The voltage generator according to claim 1, wherein the auxiliary charge pump comprises a voltage-dependent oscillator that is driven by the intermediate voltage and provides a voltage-dependent clock, the voltage-dependent clock having a frequency increasing with the magnitude of the intermediate voltage when the intermediate voltage is lower than a threshold voltage and saturating when the intermediate voltage reaches the threshold voltage.

5. The voltage generator according to claim 4, wherein when the intermediate voltage is lower than the threshold voltage, frequency of the voltage-dependent clock increases linearly with the magnitude of the intermediate voltage.

6. The voltage generator according to claim 1, wherein the auxiliary charge pump comprises a voltage-dependent oscillator and a high-precision oscillator each of which is driven by the intermediate voltage, the voltage-dependent oscillator providing a voltage-dependent clock during startup and the high-precision oscillator providing a high-precision clock when the intermediate voltage stabilizes to drive the primary charge pump.

7. The voltage generator according to claim 1, wherein the pump controller further comprises:

a power monitor logic, coupled to the reference generator, the power monitor logic comparing the input supply voltage and the intermediate voltage to the reference voltage and generating the primary and auxiliary controls.

8. The voltage generator according to claim 1, wherein the reference generator further comprises:

a bandgap reference, coupled to the auxiliary charge pump, the bandgap reference being driven by the intermediate voltage and generating a bandgap reference voltage that is substantially independent of the intermediate voltage; and a power monitor logic, coupled to the bandgap reference, the power monitor logic scaling the input supply voltage and the intermediate voltage according to a relationship between the reference voltage and the bandgap reference voltage, comparing the scaled input supply voltage and the scaled intermediate voltage to the bandgap reference voltage, and generating the primary and auxiliary controls.

* * * * *